(12) United States Patent
Wang et al.

(10) Patent No.: US 8,104,801 B2
(45) Date of Patent: Jan. 31, 2012

(54) FIXING MECHANISM AND ELECTRONIC DEVICE USING SAME

(75) Inventors: Wei-Jun Wang, Shenzhen (CN); Wei Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 221 days.

(21) Appl. No.: 12/550,751

(22) Filed: Aug. 31, 2009

(65) Prior Publication Data

US 2010/0288904 A1 Nov. 18, 2010

(30) Foreign Application Priority Data

May 12, 2009 (CN) .......................... 2009 1 0302255

(51) Int. Cl.
*E05C 1/08* (2006.01)

(52) U.S. Cl. ........ 292/163; 292/175; 292/145; 220/323; 220/293; 220/784; 220/787; 220/260; 220/300; 215/295; 215/296; 215/302

(58) Field of Classification Search ............... 292/32, 292/137, 163, 175, 145, DIG. 11, DIG. 61, 292/DIG. 53, DIG. 54, DIG. 60; 220/315, 220/323, 324, 326, 293, 784, 787, 260, 300; 215/355, 295, 296, 302

See application file for complete search history.

(56) References Cited

U.S. PATENT DOCUMENTS

| | | | | |
|---|---|---|---|---|
| 697,371 | A * | 4/1902 | Sindorf | 215/332 |
| 1,830,949 | A * | 11/1931 | Lake | 220/86.1 |
| 2,346,445 | A * | 4/1944 | Merker et al. | 217/107 |
| 3,312,336 | A * | 4/1967 | Fally | 206/0.82 |
| 4,172,532 | A * | 10/1979 | Palsson | 215/215 |
| 4,279,355 | A * | 7/1981 | Schwartz et al. | 220/300 |
| 4,400,027 | A * | 8/1983 | Nahon | 292/288 |
| 4,838,056 | A * | 6/1989 | Weinerman et al. | 70/208 |
| 5,975,592 | A * | 11/1999 | Lin | 292/37 |
| 6,053,541 | A * | 4/2000 | Harris | 292/33 |
| 7,108,135 | B2 * | 9/2006 | Park | 206/711 |
| 2007/0138182 | A1 * | 6/2007 | Wild et al. | 220/293 |

* cited by examiner

*Primary Examiner* — Alfred J Wujciak, III
*Assistant Examiner* — Michael McDuffie
(74) *Attorney, Agent, or Firm* — Altis Law Group, Inc.

(57) ABSTRACT

A fixing mechanism for fixing a battery in a sleeve defines a receiving groove therein, a latching member including a body, a restraining flange extending out from one end of the body and a contact end formed at the other end of the body, a latching slot defined in an inner surface of the sleeve, an elastic member compressed and received in the receiving groove and a barrel detachably fixed in the receiving groove. An end of the compressed elastic member resists a bottom surface of the receiving groove and the other end of the elastic member resists the restraining flange, to press the latching member contact end to pass through the barrel and finally to be received in the latching slot, and the restraining flange is blocked by the barrel.

13 Claims, 3 Drawing Sheets

FIXING MECHANISM AND ELECTRONIC DEVICE USING SAME

BACKGROUND

1. Technical Field

The present disclosure generally relates to fixing mechanisms and, particularly, to a fixing mechanism for fixing a battery cover to a sleeve, and an electronic device using the same.

2. Description of Related Art

Wireless devices, such as wireless keyboards and wireless mice, often include a battery to provide power and a sleeve to receive the battery. For insertion or removal of the battery, a detachable battery cover is often utilized.

A typical fixing mechanism for fixing a battery cover to a sleeve includes a latching member, a battery cover, a receiving groove defined in the battery cover and a latching slot defined in an inner surface of the sleeve. The latching member is received in the receiving groove and has an elastic head exposed out of the battery cover. When the battery cover is received in the sleeve, the elastic head elastically deforms, and the latching member is engaged into the latching slot, so as to fix the battery in the sleeve tightly.

The latching member is often adhered to the battery cover by glue, and may be abraded after frequent use. This may cause the battery to loosen in the sleeve due to slack between the latching member and the latching slot. If the latching member is broken, replacement of the entire battery cover is required. This increases costs.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
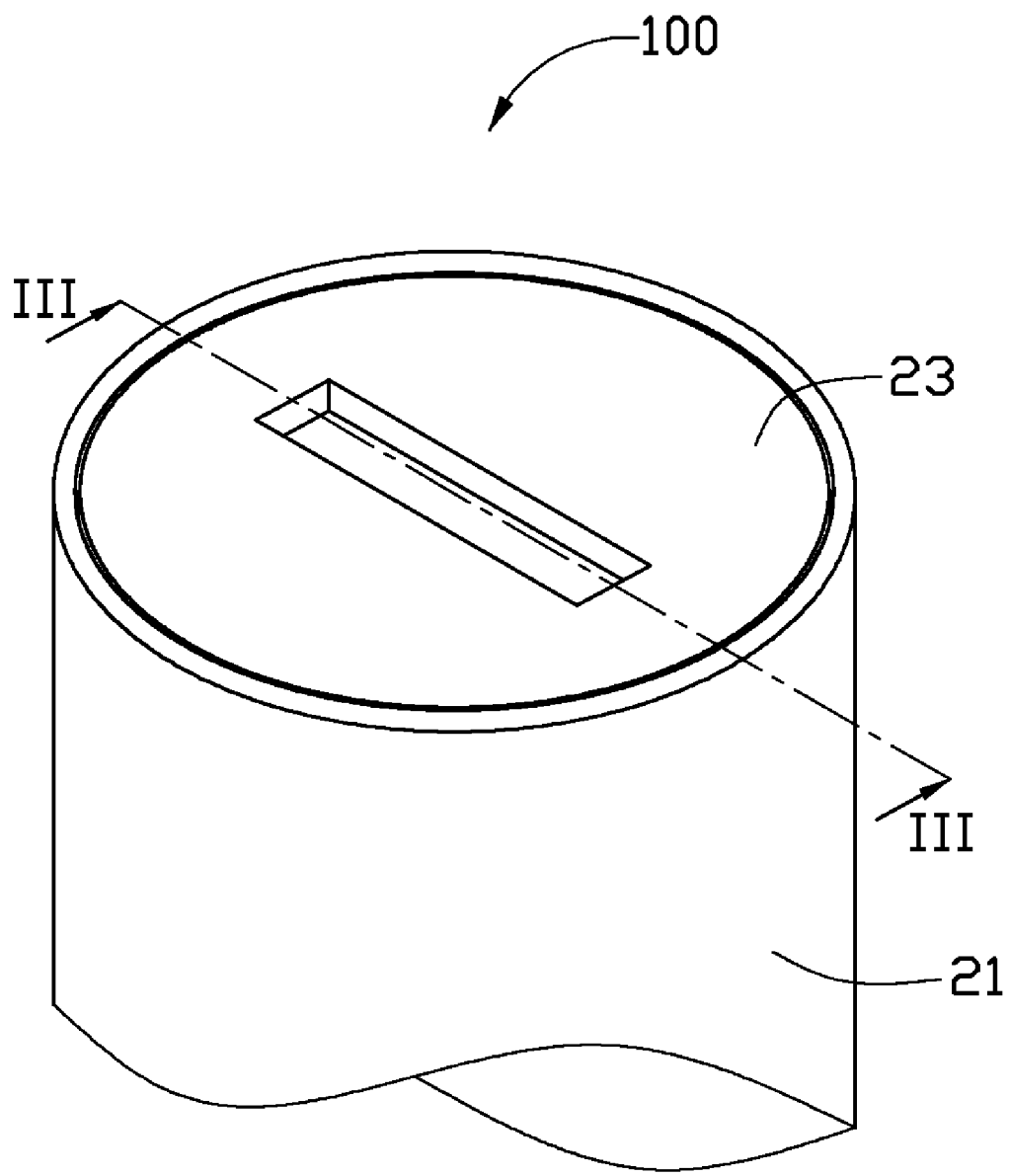
FIG. 1 is a partial, isometric view of one embodiment of an electronic device.
Figure 2:
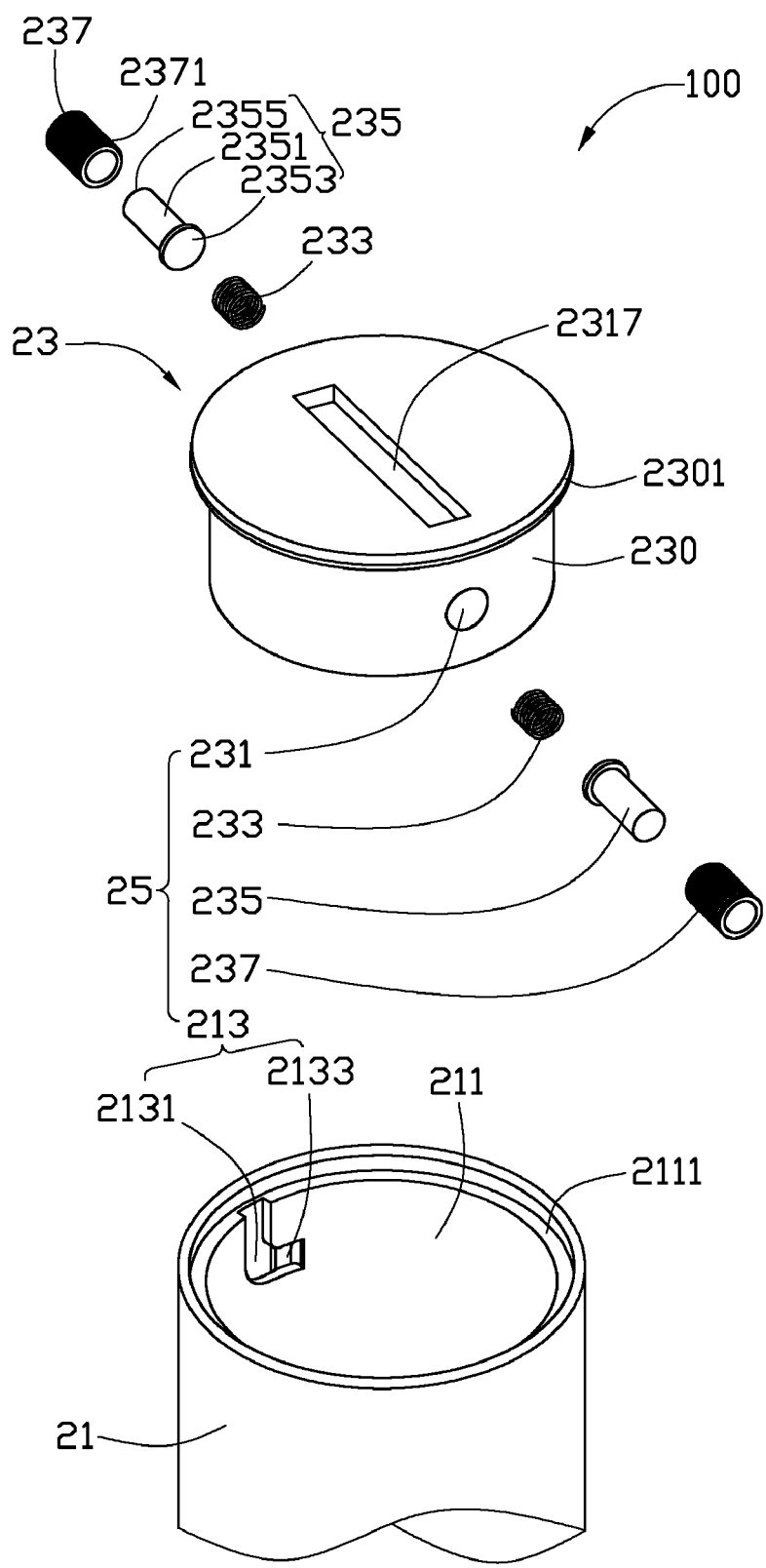
FIG. 2 is an exploded, isometric view of the electronic device of FIG. 1.

Referring to FIGS. 1 and 2, one embodiment of an electronic device 100 includes a sleeve 21, a battery cover 23, and a fixing mechanism 25, for fixing a battery (not shown) with the battery cover 23. The sleeve 21 includes a bay 211 to receive the battery, and a substantially circular continuous cutout 2111 defined in an inner side surface of an end of the sleeve 21. The battery cover 23 is substantially cylindrical, and includes a main body 230 and a cover plate 2301 fixed on the main body 230. The cover plate 2301 is also substantially circular to correspond to the continuous cutout 2111. A diameter of the cover plate 2301 is slightly larger than a diameter of the body 231. The fixing mechanism 25 includes a pair of latching slots 213, a pair of receiving grooves 231, a pair of elastic members 233, a pair of latching members 235, and a pair of barrels 237.

Figure 3:
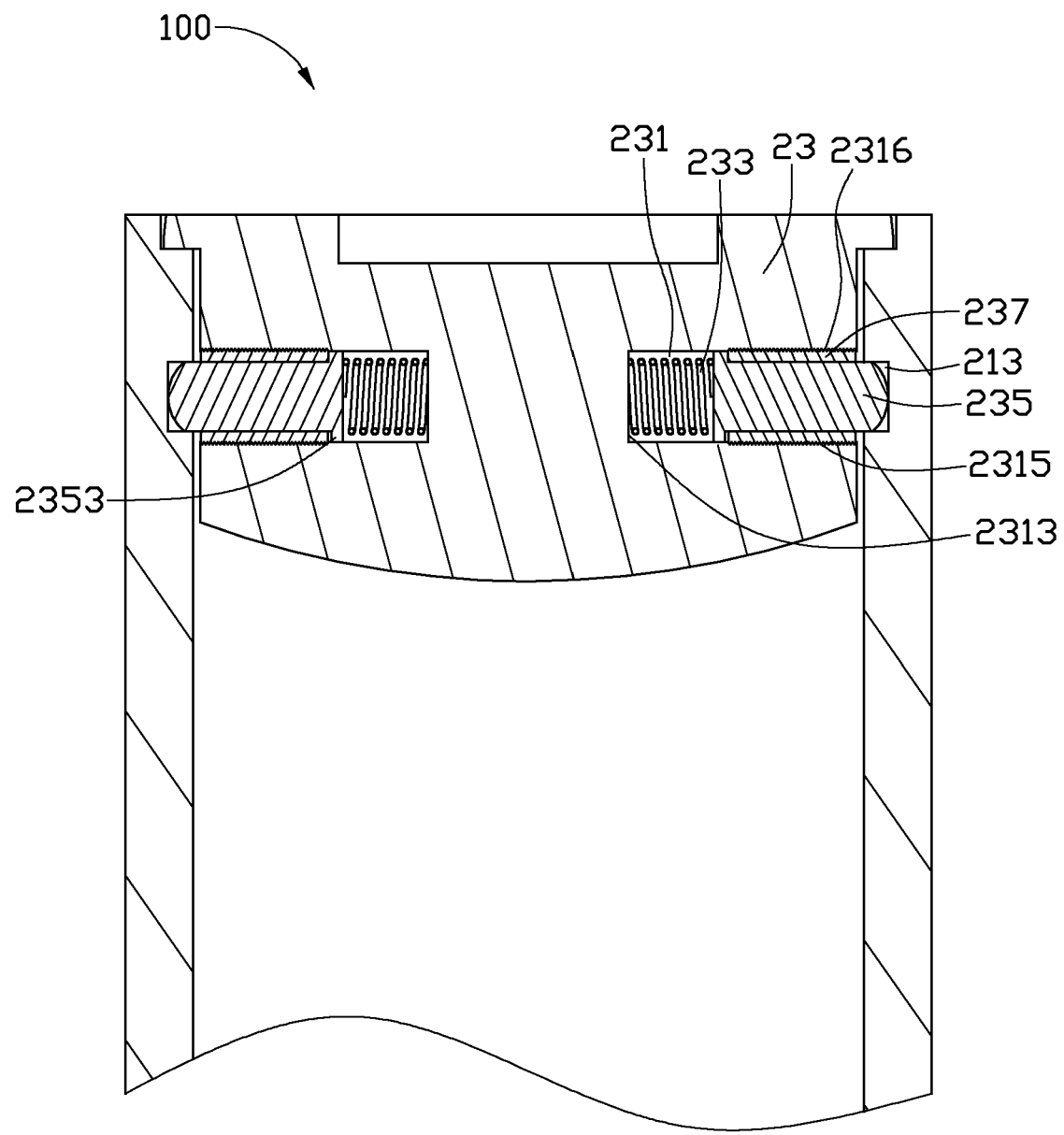
FIG. 3 is a cross-section of the electronic device of FIG. 1, taken along line III-III.

Referring to FIG. 3, the two receiving grooves 231 are defined in a side surface of the main body 230, opposite to each other. Each of the receiving grooves 231 includes a bottom surface 2313, and a side surface 2315 connecting with the bottom surface 2313. The side surface 2315 defines an inner threaded portion 2316 adjacent to an end of the receiving groove 231 away from the bottom surface 2313.

The latching member 235 includes a body 2351, a restraining flange 2353 extending out from an end of the body 2351 and a contact end 2355 formed at the other end of the body 2351. The body 2351 is substantially cylindrical and the contact end 2355 is substantially spherical.

A diameter of the barrel 237 is slightly less than a diameter of the restraining flange 2353. A length of the barrel 237 is less than that of the latching member 235. The barrel 237 includes an outer threaded portion 2371 defined on an outer surface of the barrel 237 corresponding to the inner threaded portion 2316 of the receiving groove 231.

The pair of latching slots 213 are defined in a side surface of the bay 211 corresponding to the receiving grooves 231. Each of the latching slot 213 is substantially L-shaped. Each latching slot 213 includes a guiding portion 2131 and a latching portion 2133. The guiding portion 2131 extends from the circular continuous cutout 2111 downward along the center axis of the sleeve 21. The latching portion 2133 extends from a bottom end of the guiding portion 2131 along a circumference substantially perpendicular to the center axis of the sleeve 21. A depth of the latching portion 2133 exceeds that of the guiding portion 2131.

The battery cover 23 further includes an operating slot 2317 (shown in FIG. 2) defined on a top of the cover plate 2301. A tool (not shown) engaging the operating slot 2317 can rotate the battery cover 23.

Referring to FIGS. 1 through 3, to assemble the electronic device 100, each elastic member 233 is received in the corresponding receiving groove 231. The barrel 237 is sleeved on the body 2351 of the latching member 235, and then, with the latching member 235, is engaged into the receiving groove 231. The elastic member 233 is compressed by the restraining flange 2353 of the latching member 235. The elastic member 233 applies a restoring elastic force impelling the latching member 235. The restraining flange 2353 is blocked by the barrel 237 and the contact end 2355 protrudes from the main body 230 of the battery cover 23. If an external force applied to the contact end 2355 compresses the elastic member 233, the latching member 235 is impelled toward the elastic member 233. The latching members 235 are located above the corresponding guiding portions 2131 of the latching slots 213, and are sliding into the sleeve 21 along the corresponding guiding portion 2131. At this time, the contact ends 2355 are pressed towards the corresponding elastic members 233 by a bottom surface of the guiding portion 2131. The battery cover 23 is rotated and each of the contact ends 2355 is received into the latching portion 2133. At this time, a restoring elastic force produced by the compressed elastic member 233 is applied to the corresponding latching member 235, and the contact ends 2355 are securely received in the corresponding latching portions 2133.

The barrel 237 of the fixing mechanism 200 is detachably fixed in the receiving groove 231 to restrain the elastic member 233 and the latching member 235 in the receiving groove 231. When the latching member 235 is worn, only the barrel 237 and the latching member 235 need be changed, rather than the entire battery cover 30, thus reducing repair costs.

It is noted that the scope of the disclosure is not limited to the embodiment described. The number of latching slots 213, receiving grooves 231, elastic members 233, latching members 235, and barrels 237 are specifically described and illustrated for the purpose of exemplifying various aspects of the described electronic device 100.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A fixing mechanism for fixing a battery in a sleeve with a battery cover, the fixing mechanism comprising:
   a receiving groove defined in the battery cover;
   a latching slot defined in an inner surface of the sleeve; an elastic member received in the receiving groove;
   a latching member comprising a body, a restraining flange extending out from one end of the body and a contact end formed at the other end of the body; and
   a barrel detachably sleeved on the body of the latching member and engaged into the receiving groove, wherein the restraining flange of the latching member is received in the receiving groove and blocked by the barrel; the body of the latching member passes through the barrel; the elastic member is compressed between a bottom surface of the receiving groove and the restraining flange; a return elastic force from the compressed elastic member impels the restraining flange of the latching member; the contact end of the latching member is received in the latching slot.

2. The fixing mechanism of claim 1, wherein the barrel comprises an outer threaded portion defined on an outer surface of the barrel; the receiving groove further comprises a side surface connecting with the bottom surface, and the side surface of the receiving groove comprises an inner threaded portion adjacent to an end of the receiving groove away from the bottom surface corresponding to the outer threaded portion.

3. The fixing mechanism of claim 2, wherein a length of the latching member exceeds a length of the barrel.

4. The fixing mechanism of claim 2, wherein the latching slot comprises a guiding portion and a latching portion connecting the guiding portion, and the contact end is received into the latching portion along the guiding portion.

5. The fixing mechanism of claim 4, wherein the sleeve defines a substantially circular continuous cutout in an inner surface at an end of the sleeve, and the battery cover forms a cover plate corresponding to and engaging in the circular continuous cutout.

6. The fixing mechanism of claim 5, wherein the latching slot is L-shaped, the guiding portion extends from the circular continuous cutout downward along the center axis of the sleeve; and the latching portion extends from a bottom end of the guiding portion along a circumference substantially perpendicular to the center axis of the sleeve.

7. The fixing mechanism of claim 4, wherein a depth of the latching portion exceeds a depth of the guiding portion.

8. An electronic device, comprising a sleeve, a battery cover and a fixing mechanism, the fixing mechanism comprising:
   a receiving groove defined in the battery cover;
   a latching slot defined in an inner surface of the sleeve;
   an elastic member received in the receiving groove;
   a latching member comprising a body, a restraining flange extending out from one end of the body and a contact end formed at the other end of the body; and
   a barrel detachably sleeved on the body of the latching member and engaged into the receiving groove, wherein the restraining flange of the latching member is received in the receiving groove and blocked by the barrel; the body of the latching member passes through the barrel; the elastic member is compressed between a bottom surface of the receiving groove and the restraining flange; a return elastic force from the compressed elastic member impels the restraining flange of the latching member; the contact end of the latching member is received in the latching slot.

9. The electronic device of claim 8, wherein the barrel comprises an outer threaded portion defined on an outer surface of the barrel; the receiving groove further comprises a side surface connecting with the bottom surface, and the side surface of the receiving groove comprises an inner threaded portion adjacent to an end of the receiving groove away from the bottom surface corresponding to the outer threaded portion.

10. The electronic device of claim 8, wherein a length of the latching member exceeds a length of the barrel.

11. The electronic device of claim 8, wherein the latching slot comprises a guiding portion and a latching portion connecting the guiding portion, and the contact end is received in the guiding portion and finally latches with the latching portion.

12. The electronic device of claim 11, wherein the sleeve defines a substantially circular continuous cutout in an inner surface at an end of the sleeve, and the battery cover forms a cover plate corresponding to the circular continuous cutout to engage in the circular continuous cutout.

13. The electronic device of claim 11, wherein the latching slot is L-shaped, the guiding portion extends from the circular continuous cutout downward along the center axis of the sleeve; and the latching portion extends from a bottom end of the guiding portion along a circumference substantially perpendicular to the center axis of the sleeve.

\* \* \* \* \*